United States Patent

[11] 3,611,161

[72] Inventor Brian H. Claxton
Phoenix, Ariz.
[21] Appl. No. 833,509
[22] Filed June 16, 1969
[45] Patented Oct. 5, 1971
[73] Assignee Honeywell Information Systems Inc.

[54] APPARATUS FOR SEPARATING DATA SIGNALS AND TIMING SIGNALS FROM A COMBINED SIGNAL
6 Claims, 4 Drawing Figs.

[52] U.S. Cl. 328/139, 178/69.5, 179/15, 307/232, 307/269, 328/109, 328/119, 329/50
[51] Int. Cl. H03k 5/20
[50] Field of Search 328/109, 139, 137, 119; 307/269, 232; 179/15 BS, 15 BA; 178/69.5 TV, 69.5 DC, 69.5 G, 52, 53, 53.1, 5.45 D, 88; 329/50

[56] References Cited

UNITED STATES PATENTS 3,036,271 5/1962 Alexander et al. 328/119 X
3,287,650 11/1966 Achramowicz 307/269 X
3,378,702 4/1968 Burke 307/269 X

OTHER REFERENCES

Fang, Juliusburger and Lee, " Clock and Data Retrieval Circuit," IBM Technical Disclosure Bulletin, Vol. 5, No. 11, April 1963, (P. 92, 93).

*Primary Examiner*—Donald D. Forrer
*Assistant Examiner*—R. C. Woodbridge
*Attorneys*—Edward W. Hughes and Fred Jacob

ABSTRACT: A data signal and a timing signal are combined and transmitted over a single pair of wires to apparatus for separating data signals and timing signals from the combined signal. The apparatus for separating data signals and timing signals from a combined signal has means for differentiating and rectifying the combined signal. The rectified signal applied to a one-shot causes the one-shot to produce a timing signal identical to the original timing signal. The timing signal and the combined signal applied to a flip-flop causes the flip-flop to produce a data signal identical to the original data signal.

INVENTOR.
BRIAN H. CLAXTON
BY
Lloyd B. Guernsey
AGENT

APPARATUS FOR SEPARATING DATA SIGNALS AND TIMING SIGNALS FROM A COMBINED SIGNAL

BACKGROUND OF THE INVENTION

This invention relates to data-processing systems and more particularly to an arrangement for simultaneously transmitting data signals and timing signals over a single pair of wires and for separating the data signals from the timing signals.

The computer is a significant aid in obtaining timely and efficient business management information and its primary value lies in its ability to digest large volumes of data, perform logical operations on the data, and make decisions based on established criteria. This ability has stimulated a desire on management's part to expand operations further by real time processing of the data from many remote facilities such as factories, warehouses, sales offices, and distribution centers.

Data in the form of binary digits (bits) collected at remote terminals is transmitted, in the form of data signals, over communication lines such as our nation's common and private carrier wires to a data processor. The feeding of data between the data processor and other parts of the system gives rise to substantial problems. One of these problems is the accurate synchronization of timing signals in various parts of the processing system. The timing signals are employed, for example, in transferring data into and out of the memory of the data processor. Other timing signals are used to transfer data between various peripheral devices or parts thereof. It is desirable that as few wires as possible be used between the data processor and the remote terminals. For example, it would be advantageous to transfer both the data signals and the timing signals over a single pair of wires from a remote terminal to the data processor. If these signals are combined and transmitted simultaneously over a single pair of wires some system must be provided at the data processor for separating the data signals and the timing signals from the combined signal. The data signals may comprise a series of data pulse with a positive pulse representing a binary 1 and a negative pulse representing a binary 0. The timing signals may comprise a series of timing pulses.

Accordingly, it is an object of this invention to provide a new and improved circuit for separating data signals and timing signals from a combined signal.

Another object of this invention is to provide a new and improved circuit for separating data pulses and timing pulses from a combined signal wherein the period of the timing pulse is substantially equal to the time duration of the data pulse.

Still another object of this invention is to provide a new and improved circuit for separating data pulses and timing pulses from a combined signal wherein the combined signal includes a series of timing pulses and a series of data pulses and wherein each of the timing pulses occurs at substantially the same time as a corresponding one of the data pulses.

SUMMARY OF THE INVENTION

The foregoing objects are achieved in apparatus for separating data signals and timing signals from a combined signal by employing a differentiator, a pair of inverters, a pair of rectifiers, a one-shot and a flip-flop. The differentiator has an input lead coupled to receive the combined signal and an output lead connected to the rectifiers. The rectifiers are coupled to the one-shot and to the flip-flop. The flip-flop provides data signals at the output lead and the one-shot provides timing signals.

DESCRIPTION OF THE PREFERRED EMBODIMENT

Figure 1:
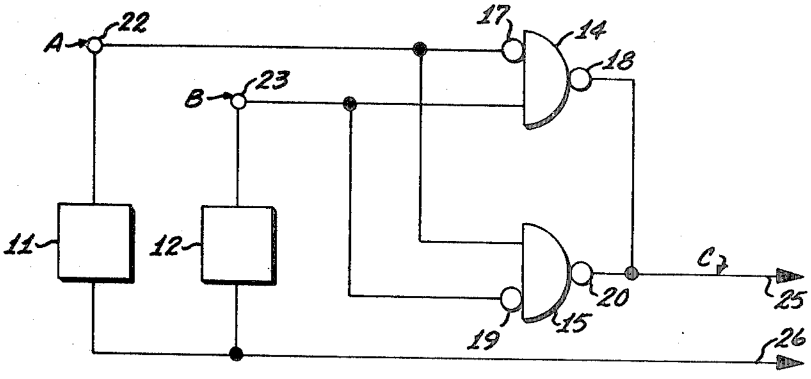
FIG. 1 is a circuit for combining timing signals and data signals into a combined signal and for transmitting this combined signal over a single pair of wires to a receiver.
Figure 2:
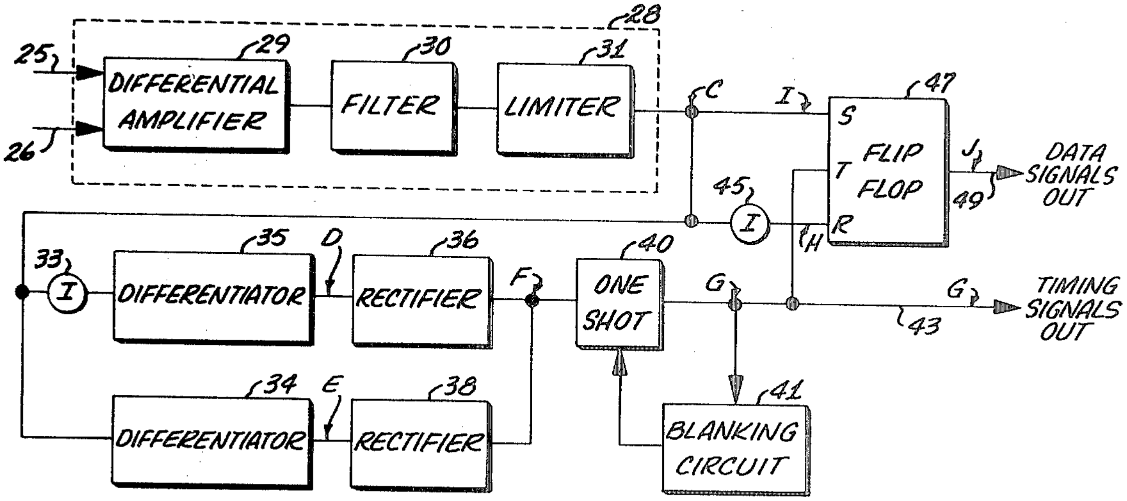
FIG. 2 is a circuit diagram of one embodiment of a receiver which can be used to receive the combined signals and separate the timing signals from the data signals.

A system for transmitting data signals and timing signals simultaneously over a single pair of wires and for separating the data signals and the timing signals from the combined signal is shown in FIG. 1 and FIG. 2. FIG. 1 shows a means for combining the data signals and the timing signals into a combined signal and FIG. 2 shows a means for separating the data signals and the timing signal from the combined signal. The means for combining data signals and timing signals as shown in FIG. 1 includes a source of data signals 11, a source of timing signals 12, first and second AND-gates 14 and 15, and a plurality of inverters 17–20. The data signals from source 11 which are applied to signal-input terminal 22 are illustrated in waveform A of FIG. 4 and the timing signals from source 12, which are applied to signal-input terminal 23, are illustrated in waveform B of FIG. 4.

The period of a data pulse is the same as the period of a timing pulse. For example, between time $t_1$ and time $t_3$ one bit of data representing a binary 1 is shown in waveform A and a single positive timing pulse is shown in waveform B. Between time $t_3$ and time $t_5$ a bit of data representing a binary 0 is shown in waveform A and a single positive timing pulse is shown in waveform B. Each time source 11 provides a data pulse, source 12 provides a positive timing pulse. For example, at time $t_1$ source 11 provides a positive data pulse and source 12 provides a positive timing pulse. At time $t_3$ source 11 provides a negative data pulse and source 12 provides a positive timing pulse.

The AND-gates disclosed in FIG. 1 provide the logical operation of conjunction for binary 1 signals applied thereto. In the system disclosed, a binary 1 is represented by a positive signal. The AND-gate provides a positive output signal representing a binary 1 when, and only when, all of the input signals applied thereto are positive and represent binary 1's. When any of the input signals is negative representing a binary 0 the AND-gate provides a negative output signal representing a binary 0.

An inverter provides the logical operation of inversion for an input signal applied thereto. The inverter provides a positive output signal representing a binary 1 when the input signal applied thereto is negative, representing a binary 0. Conversely, the inverter provides an output signal representing a binary 0 when the input signal represents a binary 1.

When the waveforms A and B have the same polarity the AND-gates 14 and 15 and inverters 17–20 provide a positive signal on the output lead 25 in FIG. 1. When the input waveforms A and B have opposite polarities AND-gates 14 and 15 and inverters 17–20 provide a negative signal on output lead 25 as illustrated in waveform C of FIG. 4. For example, between times $t_1$ and $t_2$ (FIG. 4) a positive voltage from source 11 causes inverter 17 to provide a negative voltage to one input lead of AND-gate 14 and source 12 provides a positive voltage to the other input lead of AND-gate 14 thereby causing gate 14 to provide a negative voltage at the output of AND-gate 14. The negative voltage at the output of AND-gate 14 is inverted by inverter 18 so that a positive voltage is obtained on the output lead 25 in FIG. 1.

Between times $t_2$ and $t_3$ a positive voltage from the source of data signals 11 is applied to one input lead of AND-gate 15 and a negative voltage from the source of timing signals 12 is applied to the input lead of inverter 19. The negative voltage causes inverter 19 to provide a positive voltage to the lower input lead of AND-gate 15 so that the output of AND-gate 15 is a positive voltage. The positive voltage of the output of AND-gate 15 is inverted by inverter 20 so that a negative voltage appears on the output lead 25.

Between time $t_3$ and time $t_4$ a positive voltage is applied to the lower input lead of AND-gate 14 and a negative voltage is applied to the input lead of inverter 17 thereby causing inverter 17 to provide a positive voltage on the upper input lead of AND-gate 14. This causes AND-gate 14 to develop a positive voltage which is inverted by inverter 18 thereby providing a negative voltage at the output lead 25. At this same time the positive voltage from the source timing signals 12 is applied to the inverter 19 and a negative voltage from source of data signal 11 is applied to the upper lead of gate 15. These cause AND-gate 15 to supply a positive voltage which is inverted by inverter 20 to become a negative voltage at the output lead 25. Thus, it can be seen that when two like voltages are applied to the input terminals 22 and 23 of FIG. 1 a positive voltage will appear at the output lead 25 and when two unlike voltages are applied to input terminals 22 and 23 a negative voltage will be obtained at the output lead 25.

Output leads 25 and 26 may comprise a pair of telephone wires which are connected between the circuit shown in FIG. 1 and the illustrated embodiment of FIG. 2. Noise on the telephone wires may combine with the signal shown in waveform C of FIG. 4 thereby changing the shape of the waveform. This could cause error signals in the data-processing system. In order to eliminate these error signals a means for reshaping the signals is connected to the telephone wires. In the illustrated embodiment of FIG. 2 the signals from wires 25 and 26 are applied to a means 28 for reshaping the signals so that the original signals which were transmitted from the AND-gates of FIG. 1 are shaped to the original shape. The means for reshaping includes a differential amplifier 29 which amplifies the signal, and a filter 30 and limiter 31 which aid in reshaping the combined signal to the original shape.

Figure 4:
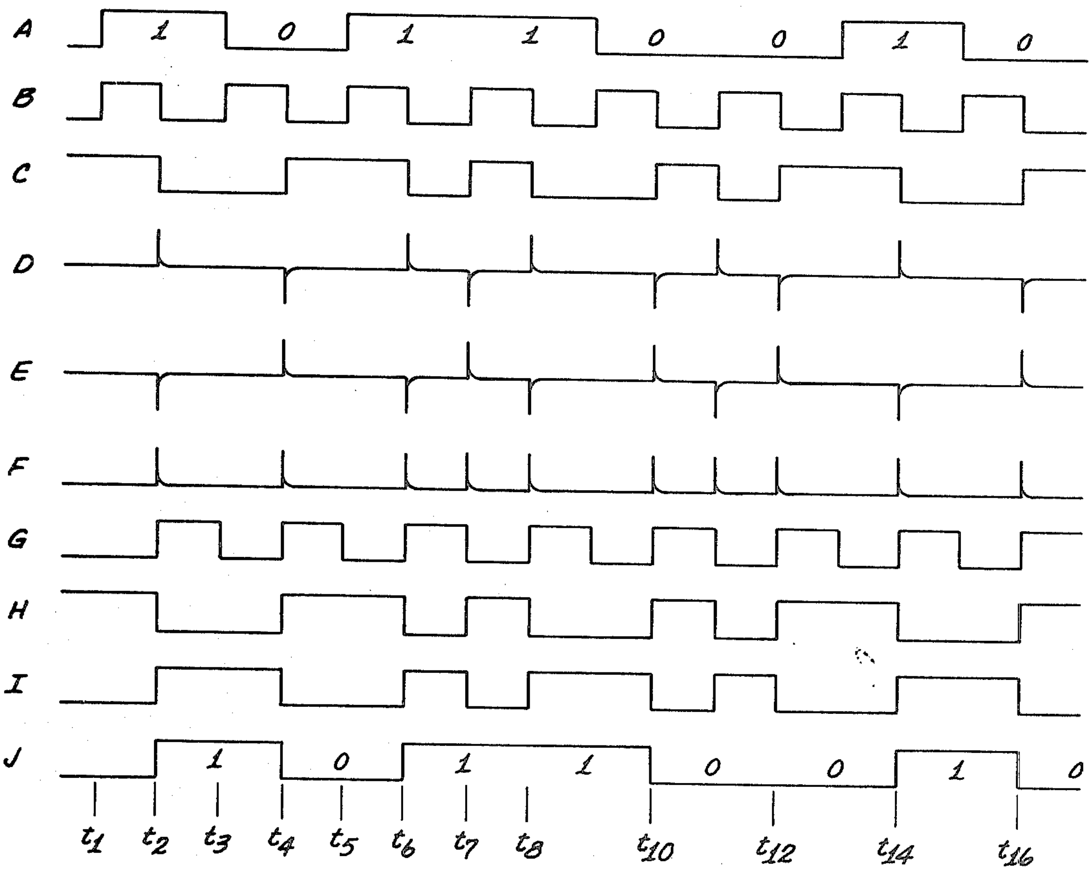
FIG. 4 illustrates waveforms which are useful in explaining the operation of the invention in FIGS. 2 and 3.

A differential amplifier is an amplifier having first and second signal-input leads and an output lead. The voltage received at the first signal-input lead is compared with the voltage received at the second signal-input lead and the amplifier produces a voltage at the output lead which is determined by the difference between the voltages at the first and second input leads. Filter 30 is a bandpass filter which allows only the combined signal to pass through and aids in eliminating noise which may develop on wires 25 and 26. Limiter 31 is an amplitude limiter which is used to square off the combined signal to eliminate any distortion of the signal which may occur on wires 25 and 26. The combined signal as shown in waveform C of FIG. 4 is applied to an inverter 33 and to a differentiator 34.

A differentiator is a circuit having a signal-input lead and a signal-output lead. The differentiator develops an output voltage which is proportional to the rate of change of the input voltage. Each abrupt change in the amplitude of the voltage at the signal-input lead causes the differentiator to produce a narrow pulse of voltage at the signal-output lead. The output of inverter 33 is applied to the input lead of a differentiator 35 which produces the output voltage as shown in waveform D of FIG. 4.

The output of the differentiator 35 is applied to the input of the rectifier 36 which removes the negative portion of the waveform so that only the positive pulses are present at the output of rectifier 36. In a similar manner the differentiator 34 provides narrow pulses of voltage which are applied to the input lead of a rectifier 38. Rectifier 38 removes the negative pulses so that only positive pulses are applied to the input lead of the one-shot 40. Inverter 33, differentiator 35 and rectifier 36 provide a positive pulse each time the combined signal (waveform C, FIG. 4) changes from a positive voltage to a negative voltage. Differentiator 34 and rectifier 38 provide a positive pulse each time the combined signal changes from a negative voltage to a positive voltage. These positive pulses from rectifier 36 and rectifier 38 are applied to the input lead of one-shot 40. These pulses from rectifiers 36 and 38 are shown in waveform F of FIG. 4.

A one-shot or monostable multivibrator 40 is a monostable circuit which operates in two states, one a stable or reset state and the other an unstable or set state. It transfers from its reset state, in which it is normally operating, to its set state upon the application of a trigger signal thereto. In its set state, the one-shot represents the binary 1 (1 state), and in the reset state the binary 0 (0 state). The lead entering the left-hand side of the one-shot symbol shown in FIG. 2 provides the set input signal. When the set input signal goes positive the one-shot is transferred to its set state and will stay in this set state for a predetermined period of time depending on the time delay rating of this one-shot and will then automatically return to its stable state (i.e., its reset state). Because the one-shot returns by itself to its reset state, no reset input is required. The period of time the one-shot remains in its set state can be controlled by the selection of electronic components used to build the one-shot.

A blanking circuit 41 connected to the output of the one-shot 40 prevents the one-shot 40 from changing states when a positive pulse is applied to the input during the middle of the timing signal pulse. Blanking circuit 41 comprises a resistor and a capacitor. When one-shot 40 is triggered by a positive pulse, for example, at time $t_6$ of waveform F, FIG. 4, one-shot 40 is set so that the voltage at the output lead is positive. This positive voltage causes the capacitor in the blanking circuit 41 to change to a positive value of voltage. This positive voltage on the capacitor in the blanking circuit prevents one-shot 40 from being triggered by another positive pulse until the capacitor discharges. If the correct values of the capacitor and resistor are chosen in the blanking circuit 41 the voltage from circuit 41 prevents the pulse at time $t_7$ (waveform F) from triggering the one-shot. It should be noted that the waveform G at the output lead of the one-shot is the same as the waveform B from the source of timing signals 12 in FIG. 1 with a time delay of half the period of the waveform, so that the timing signals which were originally developed by the source 12 in FIG. 1 have been recovered.

The composite waveform is coupled from the means for reshaping signals 28 to the set terminal of a bistable multivibrator or flip-flop 47 and the inverted waveform from the shaper 28 is applied to the reset terminal of flip-flop 47. The timing signals from the one-shot 40 are applied to the trigger terminal T of flip-flop 47. The flip-flop 47 is a bistable circuit which operates in either of two stable states, and has a set or S input terminal, a reset or R input terminal and a trigger or T input terminal. The flip-flop remains operating in either state until transferred to the other state by the application of a trigger pulse to its T input terminal while a positive voltage is applied to the corresponding S or R terminal. In one state of operation the flip-flop represents the binary 1 (1 state) and in the other state the binary 0 (0 state). When a positive trigger pulse is applied to the T terminal while a positive voltage is applied to the S terminal the flip-flop is set so that it represents a binary 1 (1 state). When a positive trigger pulse is applied to the T terminal while a positive voltage is applied to the R terminal the flip-flop is reset so that it operates in a state representing a binary 0 (0 state).

When flip-flop 47 is in the 1 state a positive voltage is provided at the output lead 49 and when the flip-flop is in the 0 state a negative voltage is provided at the output lead 49. The output waveform representing the data signals from flip-flop 47 is shown in waveform J of FIG. 4. The timing signals from the one-shot 40 which are provided to the output lead 43 are shown in waveform G of FIG. 4.

At time $t_2$ (FIG. 4) a positive voltage applied to the S terminal and a positive voltage applied to the T terminal cause the flip-flop 47 to be set to the 1 state so that the voltage at the output lead 49 has a positive value as shown in waveform J (FIG. 4). At time $t_4$ a positive voltage applied to the R terminal and a positive voltage applied to the T terminal cause the flip-flop 47 to be reset so that the voltage at the output lead 49 has a negative value. The waveform J at the output lead 49 is the same as the waveform A from the source of data signals 11 (FIG. 1) with a time delay of one-half the period of a binary pulse.

Thus, the original data signals of waveform A have been recovered at the output lead 49 as shown in waveform J and the original timing signals of waveform B have been recovered at the output lead 43 as shown in waveform G of FIG. 4.

Figure 3:
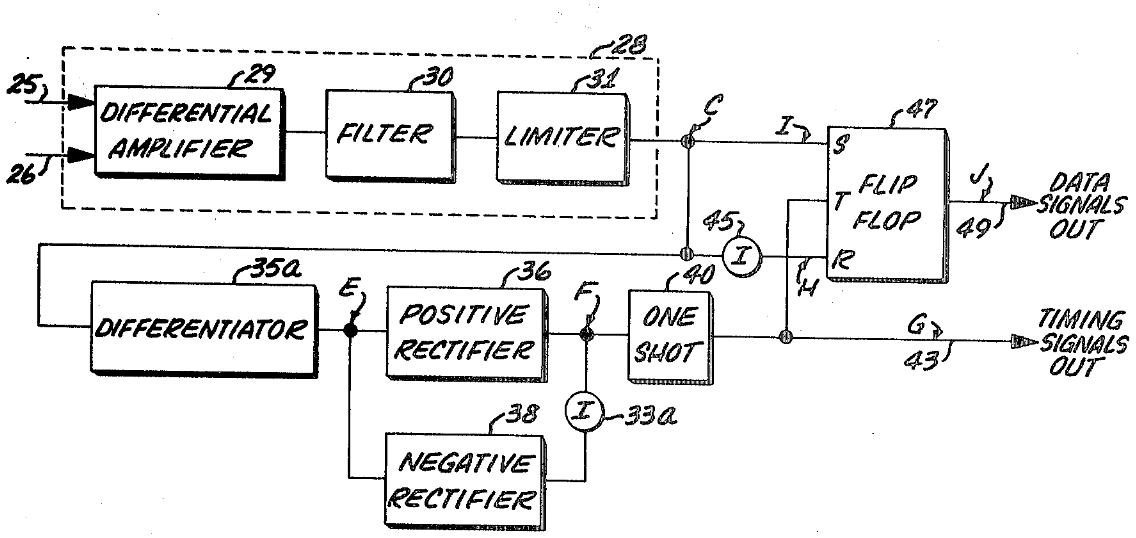
FIG. 3 is a circuit diagram of another embodiment of a receiver which can be used to separate the timing signals from the data signals.

FIG. 3 illustrates a second embodiment of the invention shown in FIG. 2 wherein like parts have similar reference characters. The circuit in FIG. 3 differs from the circuit of FIG. 2 in that one differentiator **35*a* is used instead of the two used in FIG. 2. The combined signal as shown in waveform C of FIG. 4 is differentiated by differentiator 35*a*. The output of differentiator 35*a*, shown in waveform E of FIG. 4, is coupled to rectifiers 36 and 38. The positive pulses from differentiator 35*a* are transferred through rectifier 36 to one-shot 40. The negative pulses from differentiator 35*a* are transferred through rectifier 38 to inverter 33*a* which changes the negative pulses into positive pulses. These positive pulses from inverter 33*a* are applied to the input lead of one-shot 40. The pulses from rectifier 36 and inverter 33*a*** are shown in waveform F of FIG. 4.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. Apparatus for separating data signals and timing signals from a combined signal which contains timing pulses and data pulses wherein the period of each timing pulse is substantially the same as the period of each data pulse, said apparatus comprising: a differentiator having an input lead and an output lead; said combined signal being coupled to said input lead of said differentiator; a bistable multivibrator, said combined signal being coupled to said multivibrator; first and second rectifiers; and a monostable multivibrator having an input lead and an output lead, said first and said second rectifiers each being connected between said output lead of said differentiator and said input lead of said monostable multivibrator, said output lead of said monostable multivibrator being coupled to said bistable multivibrator.

2. Apparatus for separating data signals and timing signals from a combined signal as defined in claim 1 including: an inverter, said inverter being connected between said second rectifier and said input lead of said monostable multivibrator.

3. Apparatus for separating data signals and timing signals from a combined signal which contains timing pulses and data pulses wherein the period of each timing pulse is substantially the same as the period of each data pulse, said apparatus comprising: a differentiator having an input lead and an output lead; a bistable multivibrator having a set input lead, a reset input lead and a trigger input lead, said combined signal being coupled to said input lead of said differentiator and to said set input lead of said multivibrator; first and second inverters, said first inverter being connected between said input lead of said differentiator and said reset lead of said multivibrator; first and second rectifiers; and a monostable multivibrator having an input lead and an output lead, said first rectifier being connected between said output lead of said differentiator and said input lead of said monostable multivibrator, said second rectifier being connected to said output lead of said differentiator, said second inverter being connected between said second rectifier and said input lead of said monostable multivibrator, said output lead of said monostable multivibrator being connected to said trigger lead of said bistable multivibrator.

4. Apparatus for separating data signals and timing signals from a combined signal as defined in claim 3 including: a blanking circuit, said blanking circuit being coupled to said monostable multivibrator, said blanking circuit providing a signal to said monostable multivibrator to cause said monostable multivibrator to remain in a reset state for a predetermined period of time following the resetting of said monostable multivibrator.

5. Apparatus for separating data signals and timing signals from a combined signal which contains timing pulses and data pulses wherein the period of each timing pulse is substantially the same as the period of each data pulse, said apparatus comprising: first and second differentiators each having an input lead and an output lead; first and second inverters, said combined signal being coupled to said input lead of said first differentiator, said first inverter being connected between said input lead of said first differentiator and said input lead of said second differentiator; a bistable multivibrator having a set input lead, a reset input lead and a trigger input lead, said set input lead of said multivibrator being connected to said input lead of said first differentiator said second inverter being connected between said reset lead of said multivibrator and said input lead of said first differentiator; first and second rectifiers; and a monostable multivibrator having an input lead and an output lead, said first rectifier being connected between said output lead of said first differentiator and said input lead of said monostable multivibrator, said second rectifier being connected between said output lead of said second differentiator and said input lead of said monostable multivibrator, said output lead of said monostable multivibrator being connected to said trigger input lead of said bistable multivibrator.

6. Apparatus for separating data signals and timing signals from a combined signal as defined in claim 5 including: a blanking circuit, said blanking circuit being coupled to said monostable multivibrator, said blanking circuit providing a signal to said monostable multivibrator to cause said monostable multivibrator to remain in a reset state for a predetermined period of time following the resetting of said monostable multivibrator.